US011582105B2

(12) United States Patent
Jacob Da Silva et al.

(10) Patent No.: US 11,582,105 B2
(45) Date of Patent: Feb. 14, 2023

(54) TELEMETRY-BASED NETWORK SWITCH CONFIGURATION VALIDATION

(71) Applicant: LENOVO ENTERPRISE SOLUTIONS (SINGAPORE) PTE. LTD., Singapore (SG)

(72) Inventors: Roberto Jacob Da Silva, Oak Park, CA (US); Corneliu-Ilie Calciu, Bucharest (RO); Radu Mihai Iorga, Bucharest (RO); Chidambaram Bhagavathiperumal, Livermore, CA (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/916,238

(22) Filed: Jun. 30, 2020

(65) Prior Publication Data

US 2021/0409271 A1 Dec. 30, 2021

(51) Int. Cl.
*H04L 41/0853* (2022.01)
*H04L 43/04* (2022.01)

(52) U.S. Cl.
CPC .......... *H04L 41/0853* (2013.01); *H04L 43/04* (2013.01)

(58) Field of Classification Search
CPC . H04L 41/0853; H04L 43/04; H04L 41/0856; H04L 41/0859; H04L 41/0863
See application file for complete search history.

(56) References Cited

U.S. PATENT DOCUMENTS

| | | | | |
|---|---|---|---|---|
| 9,755,900 | B2 * | 9/2017 | Tenginakai | H04L 41/0889 |
| 9,935,831 | B1 * | 4/2018 | Wundsam | H04L 49/351 |
| 10,212,034 | B1 * | 2/2019 | Carranza Giotto | H04L 41/0816 |
| 10,505,805 | B1 * | 12/2019 | Viswanathan | H04L 41/0856 |
| 10,778,539 | B1 * | 9/2020 | Hussain | H04L 41/22 |
| 10,797,952 | B1 * | 10/2020 | Mills | H04L 41/0893 |
| 10,873,593 | B2 * | 12/2020 | Gandham | H04L 41/145 |

(Continued)

OTHER PUBLICATIONS

Veriflow, "Network Complexity, Change, and Human Factors are Failing the Business: A Global Survey of Network Professionals," dimensional research, URL: https://www.veriflow.net/wp-content/uploads/2016/11/VRFL0926-Veriflow-Survey-PPT-FINAL.pdf, dated Oct. 2016, 32 pages.

(Continued)

*Primary Examiner* — Jerry B Dennison

(57) ABSTRACT

Methods, apparatuses, and computer program products for telemetry-based network switch configuration validation are disclosed. An analytics engine captures a first network snapshot including telemetry data received from one or more network switches in a first state. Upon receiving a notice indicating that a network configuration change has been applied, the analytics engine initiates a timer in response to receiving the notice. The analytics engine captures, in response to expiration of the timer, a second network snapshot including telemetry data received from the one or more network switches in a second state and compares the first network snapshot and the second network snapshot. In dependence upon the comparison of the first network snapshot to the second network snapshot, the analytics engine validates the network configuration change.

20 Claims, 8 Drawing Sheets

(56) References Cited

U.S. PATENT DOCUMENTS

| | | | | |
|---|---|---|---|---|
| 10,931,692 | B1 * | 2/2021 | Mota | H04L 63/1458 |
| 11,038,750 | B2 * | 6/2021 | Darden | H04L 41/22 |
| 2003/0233431 | A1 * | 12/2003 | Reddy | H04L 41/082 709/221 |
| 2003/0233571 | A1 * | 12/2003 | Kraus | H04L 67/1002 726/15 |
| 2005/0256961 | A1 * | 11/2005 | Alon | H04L 41/147 709/229 |
| 2009/0213758 | A1 * | 8/2009 | Girolamo | H04W 24/02 370/254 |
| 2012/0143821 | A1 * | 6/2012 | Mallya | H04L 41/046 707/639 |
| 2014/0258479 | A1 * | 9/2014 | Tenginakai | H04L 41/0869 709/220 |
| 2015/0350015 | A1 * | 12/2015 | Clemm | H04L 43/0829 709/221 |
| 2016/0036636 | A1 * | 2/2016 | Erickson | H04L 41/145 370/248 |
| 2016/0080502 | A1 * | 3/2016 | Yadav | H04L 47/22 709/227 |
| 2016/0112269 | A1 * | 4/2016 | Singh | H04L 43/065 709/224 |
| 2017/0206292 | A1 * | 7/2017 | Bennett | G06F 30/18 |
| 2018/0115469 | A1 * | 4/2018 | Erickson | H04L 41/12 |
| 2018/0309623 | A1 * | 10/2018 | Szobi | H04L 41/0869 |
| 2019/0173805 | A1 * | 6/2019 | Balan | H04L 45/28 |
| 2019/0230112 | A1 * | 7/2019 | Gandham | H04L 63/1458 |
| 2019/0296971 | A1 * | 9/2019 | Clark | H04L 41/0816 |
| 2020/0127893 | A1 * | 4/2020 | Hume | H04L 63/1408 |
| 2020/0162462 | A1 * | 5/2020 | Zayats | H04L 41/0869 |
| 2021/0090028 | A1 * | 3/2021 | Suenderhauf | G06Q 10/105 |
| 2021/0392135 | A1 * | 12/2021 | Rao | H04L 63/083 |
| 2021/0392165 | A1 * | 12/2021 | Rao | H04L 63/1441 |

OTHER PUBLICATIONS

Veriflow, "vmware to Advance Network Monitoring with Acquisition of Veriflow," URL: https://www.veriflow.net, retrieved Feb. 3, 2020, 9 pages.

* cited by examiner

```
┌─────────────────────────────────────────────────────────────────────────────┐
│ capture, by an analytics engine, a first network snapshot including telemetry data received from │
│                 one or more network switches in a first state 410                                │
└─────────────────────────────────────────────────────────────────────────────┘
                                        │
                                        ▼
┌─────────────────────────────────────────────────────────────────────────────┐
│        receive a notice indicating that network configuration change has been applied 420        │
└─────────────────────────────────────────────────────────────────────────────┘
                                        │
                                        ▼
┌─────────────────────────────────────────────────────────────────────────────┐
│              initiate, by the analytics engine, a timer in response to receiving the notice 430              │
└─────────────────────────────────────────────────────────────────────────────┘
                                        │
                                        ▼
┌─────────────────────────────────────────────────────────────────────────────┐
│ capture, by the analytics engine in response to expiration of the timer, a second network snapshot │
│      including telemetry data received from the one or more network switches in a second state 440      │
└─────────────────────────────────────────────────────────────────────────────┘
                                        │
                                        ▼
┌─────────────────────────────────────────────────────────────────────────────┐
│       compare, by the analytics engine, the first network snapshot and the second network snapshot       │
│                                             450                                             │
└─────────────────────────────────────────────────────────────────────────────┘
                                        │
                                        ▼
┌─────────────────────────────────────────────────────────────────────────────┐
│ validate, in dependence upon the comparison of the first network snapshot to the second network │
│                       snapshot, the network configuration change 460                       │
└─────────────────────────────────────────────────────────────────────────────┘
```

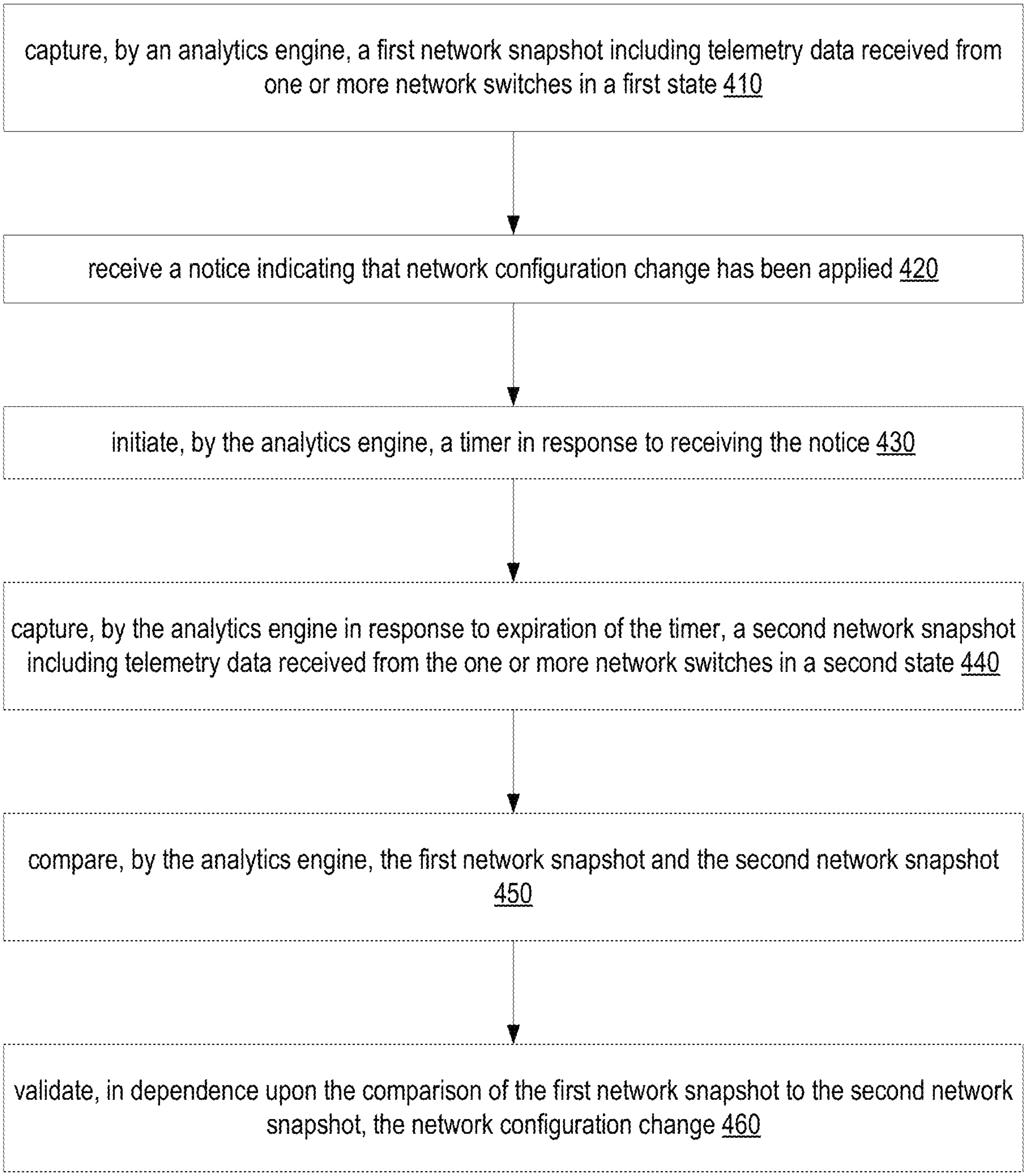

FIG. 4

```
┌─────────────────────────────────────────────────────────────────────┐
│ capture, by an analytics engine, a first network snapshot including │
│ telemetry data received from one or more network switches in a      │
│ first state 410                                                     │
│  ┌───────────────────────────────────────────────────────────────┐  │
│  │ receive, from a requestor, a request to create a              │  │
│  │ pre-configuration snapshot 510                                │  │
│  └───────────────────────────────────────────────────────────────┘  │
│                              ▼                                       │
│  ┌───────────────────────────────────────────────────────────────┐  │
│  │ collect current state information from the telemetry data    │  │
│  │ received from the one or more switches 520                    │  │
│  └───────────────────────────────────────────────────────────────┘  │
│                              ▼                                       │
│  ┌───────────────────────────────────────────────────────────────┐  │
│  │ generate the first network snapshot from the collected        │  │
│  │ state information 530                                         │  │
│  └───────────────────────────────────────────────────────────────┘  │
│                              ▼                                       │
│  ┌───────────────────────────────────────────────────────────────┐  │
│  │ send, to the requestor, an indication that the                │  │
│  │ pre-configuration snapshot has been created 540               │  │
│  └───────────────────────────────────────────────────────────────┘  │
└─────────────────────────────────────────────────────────────────────┘
                                ▼
┌─────────────────────────────────────────────────────────────────────┐
│ receive a notice indicating that network configuration change has   │
│ been applied 420                                                    │
└─────────────────────────────────────────────────────────────────────┘
                                ▼
┌─────────────────────────────────────────────────────────────────────┐
│ initiate, by the analytics engine, a timer in response to receiving │
│ the notice 430                                                      │
└─────────────────────────────────────────────────────────────────────┘
                                ▼
┌─────────────────────────────────────────────────────────────────────┐
│ capture, by the analytics engine in response to expiration of the   │
│ timer, a second network snapshot including telemetry data received  │
│ from the one or more network switches in a second state 440         │
└─────────────────────────────────────────────────────────────────────┘
                                ▼
┌─────────────────────────────────────────────────────────────────────┐
│ compare, by the analytics engine, the first network snapshot and    │
│ the second network snapshot 450                                     │
└─────────────────────────────────────────────────────────────────────┘
                                ▼
┌─────────────────────────────────────────────────────────────────────┐
│ validate, in dependence upon the comparison of the first network    │
│ snapshot to the second network snapshot, the network configuration  │
│ change 460                                                          │
└─────────────────────────────────────────────────────────────────────┘
```

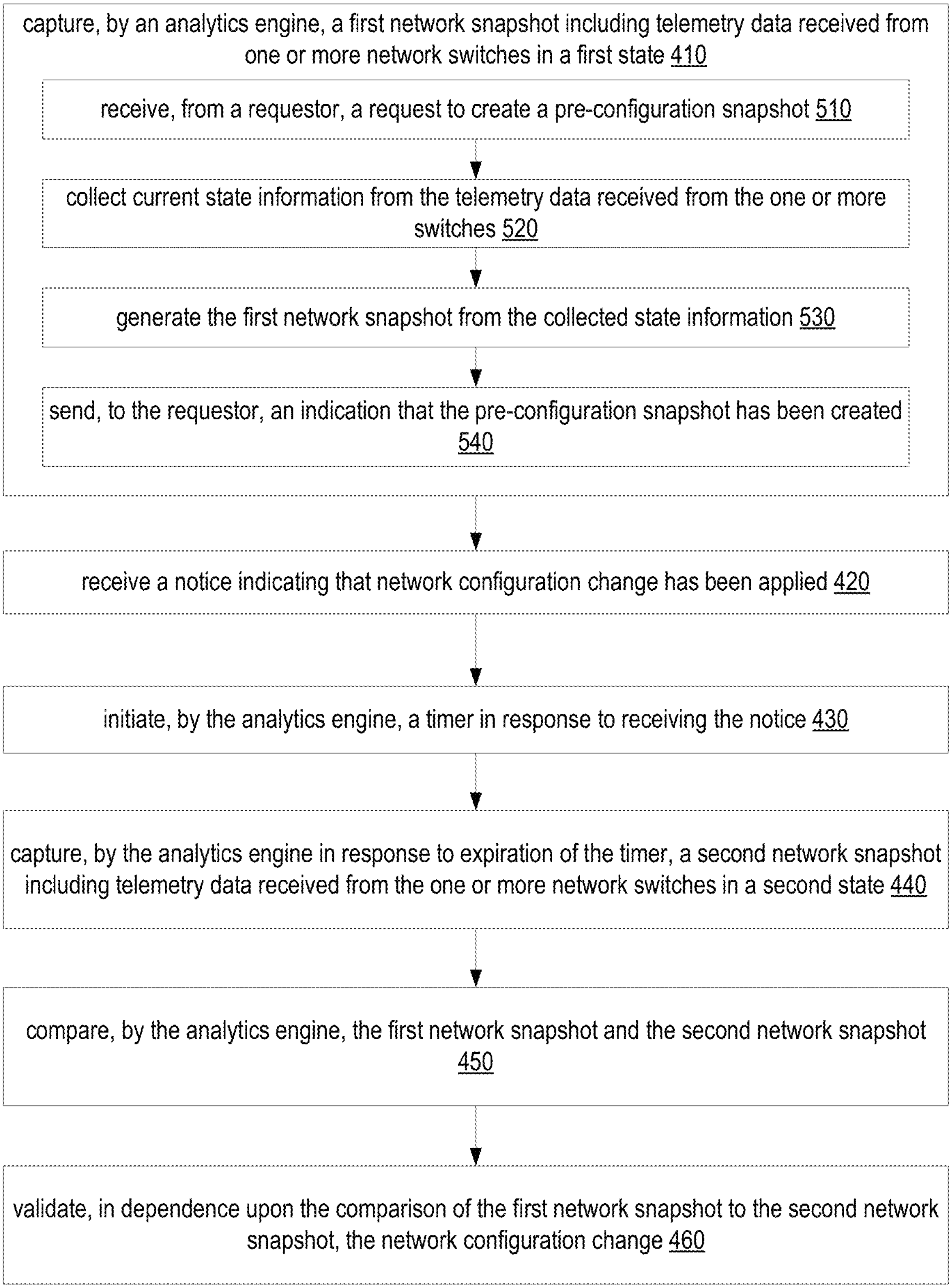

FIG. 5 capture, by an analytics engine, a first network snapshot including telemetry data received from one or more network switches in a first state 410 receive a notice indicating that network configuration change has been applied 420 initiate, by the analytics engine, a timer in response to receiving the notice 430 capture, by the analytics engine in response to expiration of the timer, a second network snapshot including telemetry data received from the one or more network switches in a second state 440 collect, after the timer has expired, current state information from the telemetry data received from the one or more switches 610 generate the second network snapshot from the collected state information 620 compare, by the analytics engine, the first network snapshot and the second network snapshot 450 validate, in dependence upon the comparison of the first network snapshot to the second network snapshot, the network configuration change 460

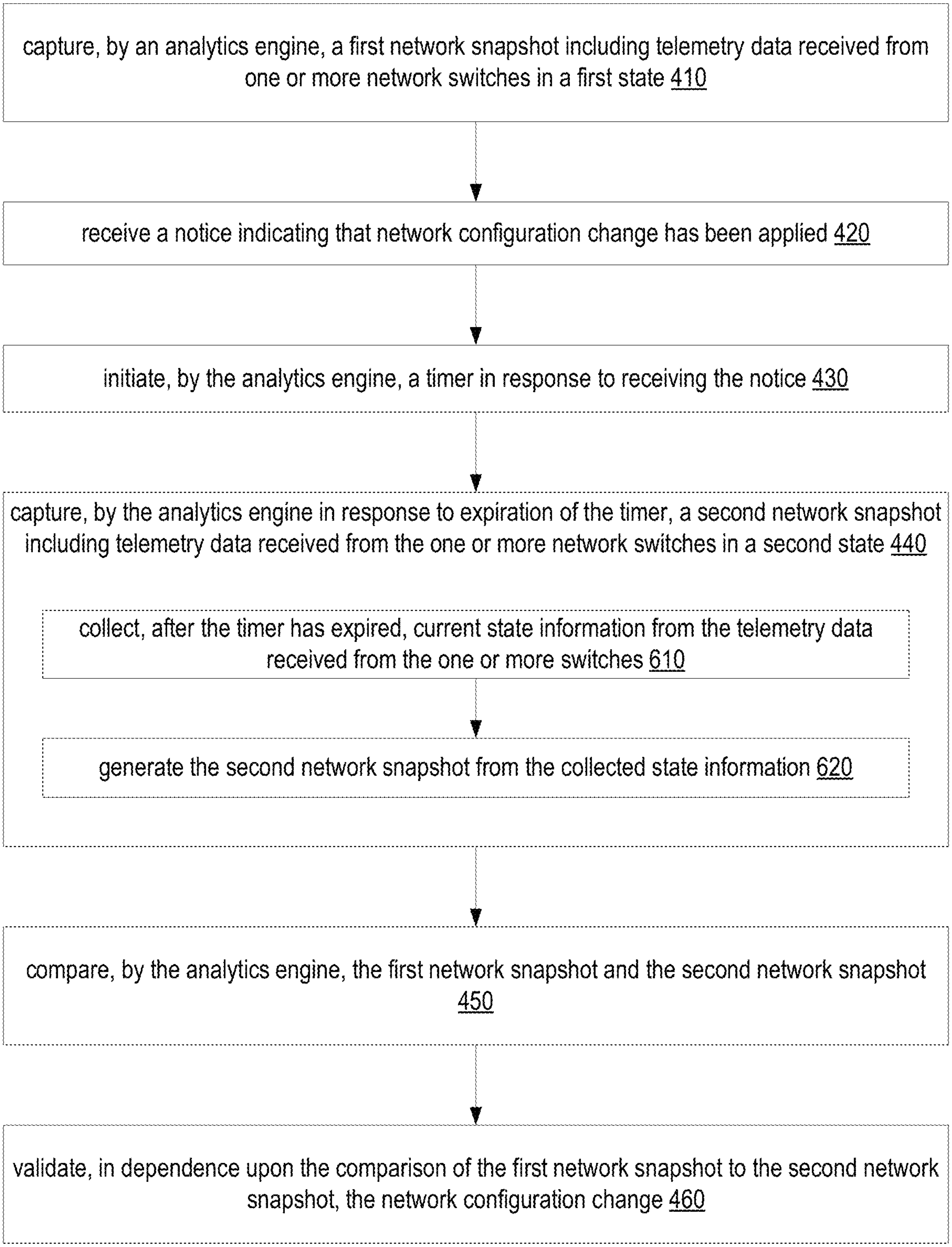

FIG. 6

```
┌─────────────────────────────────────────────────────────────────────────┐
│ capture, by an analytics engine, a first network snapshot including     │
│ telemetry data received from one or more network switches in a first    │
│ state 410                                                               │
└─────────────────────────────────────────────────────────────────────────┘
                                    │
                                    ▼
┌─────────────────────────────────────────────────────────────────────────┐
│ receive a notice indicating that network configuration change has been  │
│ applied 420                                                             │
└─────────────────────────────────────────────────────────────────────────┘
                                    │
                                    ▼
┌─────────────────────────────────────────────────────────────────────────┐
│ initiate, by the analytics engine, a timer in response to receiving the │
│ notice 430                                                              │
└─────────────────────────────────────────────────────────────────────────┘
                                    │
                                    ▼
┌─────────────────────────────────────────────────────────────────────────┐
│ capture, by the analytics engine in response to expiration of the timer,│
│ a second network snapshot including telemetry data received from the    │
│ one or more network switches in a second state 440                      │
└─────────────────────────────────────────────────────────────────────────┘
                                    │
                                    ▼
┌─────────────────────────────────────────────────────────────────────────┐
│ compare, by the analytics engine, the first network snapshot and the    │
│ second network snapshot 450                                             │
│  ┌───────────────────────────────────────────────────────────────────┐  │
│  │ compare, for each network switch, first state information from    │  │
│  │ first network snapshot to a corresponding second state            │  │
│  │ information from the second network snapshot 710                  │  │
│  └───────────────────────────────────────────────────────────────────┘  │
│                                    │                                    │
│                                    ▼                                    │
│  ┌───────────────────────────────────────────────────────────────────┐  │
│  │ determine whether the state information from the second network  │  │
│  │ snapshot indicates anomalous behavior in the network 720          │  │
│  └───────────────────────────────────────────────────────────────────┘  │
└─────────────────────────────────────────────────────────────────────────┘
                                    │
                                    ▼
┌─────────────────────────────────────────────────────────────────────────┐
│ validate, in dependence upon the comparison of the first network        │
│ snapshot to the second network snapshot, the network configuration      │
│ change 460                                                              │
└─────────────────────────────────────────────────────────────────────────┘
```

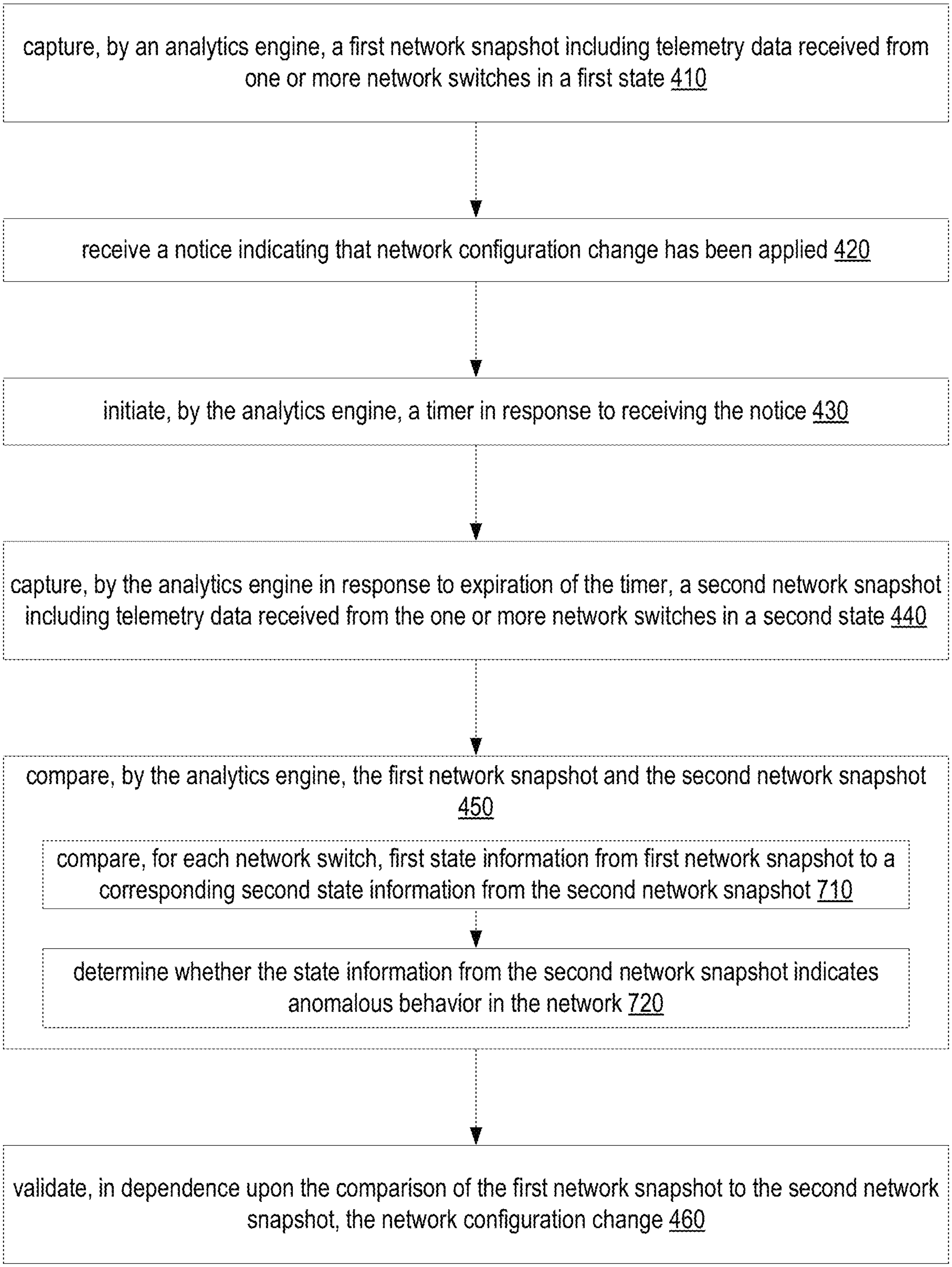

FIG. 7

TELEMETRY-BASED NETWORK SWITCH CONFIGURATION VALIDATION

BACKGROUND

Field of the Invention

The field of the invention is data processing, or, more specifically, methods, apparatus, and products for telemetry-based network switch configuration validation.

Description of Related Art

To enable communication among devices in a computer network, the network relies on computer network infrastructure that includes various types of network devices such switches, servers, routers, hubs, bridges, gateways, and the like. Each of these network devices is typically installed by IT (Information Technology) personnel and configured either manually by IT personnel or through network administration applications. Various situations may require changes to the physical network infrastructure (e.g., installing or removing devices and connections) or the configurations of the network devices. These changes may introduce errors in the network that affect network performance or may even result in network failure. While some changes may have an immediate impact on the network, other problems caused by the changes might not manifest until much later. Thus, corrective action may require lengthy troubleshooting before the network problems are traced back to the configuration changes. During this time, the network performance may continue to worsen. Therefore, it would be advantageous to provide a mechanism to detect potential network problems induced by the configuration changes before those problems severely impact network performance.

SUMMARY

Embodiments in accordance with the present invention include an analytics system, driven by network telemetry information, that coordinates with a management system during network configuration operations to validate network configuration changes and avoid serious network problems potentially caused by the configuration changes.

An embodiment in accordance with the present invention is directed to a method of telemetry-based network switch configuration validation, the method comprising capturing, by an analytics engine, a first network snapshot including telemetry data received from one or more network switches in a first state, receiving a notice indicating that a network configuration change has been applied, initiating, by the analytics engine, a timer in response to receiving the notice, capturing, by the analytics engine in response to expiration of the timer, a second network snapshot including telemetry data received from the one or more network switches in a second state, comparing, by the analytics engine, the first network snapshot and the second network snapshot, and validating, in dependence upon the comparison of the first network snapshot to the second network snapshot, the network configuration change. For example, the telemetry data for each switch may include one or more of buffer utilization metrics, congestion metrics, forwarding table utilization metrics, system statistics, and error messages.

Another embodiment in accordance with the present invention is directed to an apparatus for telemetry-based network switch configuration validation, the apparatus comprising a computer processor, a computer memory operatively coupled to the computer processor, the computer memory having disposed within it computer program instructions that, when executed by the computer processor, cause the apparatus to carry out the steps of capturing, by an analytics engine, a first network snapshot including telemetry data received from one or more network switches in a first state, receiving a notice indicating that a network configuration change has been applied, initiating, by the analytics engine, a timer in response to receiving the notice, capturing, by the analytics engine in response to expiration of the timer, a second network snapshot including telemetry data received from the one or more network switches in a second state, comparing, by the analytics engine, the first network snapshot and the second network snapshot, and validating, in dependence upon the comparison of the first network snapshot to the second network snapshot, the network configuration change. For example, the telemetry data for each switch may include one or more of buffer utilization metrics, congestion metrics, forwarding table utilization metrics, interface statuses, system statistics, and error messages.

Yet another embodiment in accordance with the present invention is directed to computer program product for telemetry-based network switch configuration validation, the computer program product disposed upon a computer readable medium, the computer program product comprising computer program instructions that, when executed, cause a computer to carry out the steps of capturing, by an analytics engine, a first network snapshot including telemetry data received from one or more network switches in a first state, receiving a notice indicating that a network configuration change has been applied, initiating, by the analytics engine, a timer in response to receiving the notice, capturing, by the analytics engine in response to expiration of the timer, a second network snapshot including telemetry data received from the one or more network switches in a second state, comparing, by the analytics engine, the first network snapshot and the second network snapshot, and validating, in dependence upon the comparison of the first network snapshot to the second network snapshot, the network configuration change. For example, the telemetry data for each switch may include one or more of buffer utilization metrics, congestion metrics, forwarding table utilization metrics, system statistics, and error messages.

In various embodiments, capturing, by the analytics engine, the first network snapshot including telemetry data received from the one or more network switches in the first state may include receiving, from a requestor, a request to create a pre-configuration snapshot, collecting current state information from the telemetry data received from the one or more switches, generating the first network snapshot from the collected state information, and sending, to the requestor, an indication that the pre-configuration snapshot has been created.

In various embodiments, capturing, by the analytics engine in response to expiration of the timer, the second network snapshot including telemetry data received from the one or more network switches in the second state may include collecting, after the timer has expired, current state information from the telemetry data received from the one or more switches and generating the second network snapshot from the collected state information.

In various embodiments, comparing the first network snapshot and the second network snapshot may include comparing, for each network switch, first state information from first network snapshot to a corresponding second state information from the second network snapshot and determining whether the state information from the second network snapshot indicates anomalous behavior in the network.

In various embodiments, validating, in dependence upon the comparison of the first network snapshot to the second network snapshot, the network configuration change may include when a potential network malfunction is not detected from the comparison, generating a validation passed notification, and when a potential network malfunction is detected from the comparison, generating a validation failed notification including a diagnostic report.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 4 sets forth a flow chart illustrating an exemplary method for telemetry-based network switch configuration validation according to embodiments of the present invention.

FIG. 5 sets forth a flow chart illustrating another exemplary method for telemetry-based network switch configuration validation according to embodiments of the present invention.

FIG. 6 sets forth a flow chart illustrating another exemplary method for telemetry-based network switch configuration validation according to embodiments of the present invention.

FIG. 7 sets forth a flow chart illustrating another exemplary method for telemetry-based network switch configuration validation according to embodiments of the present invention.

DETAILED DESCRIPTION

Figure 1:
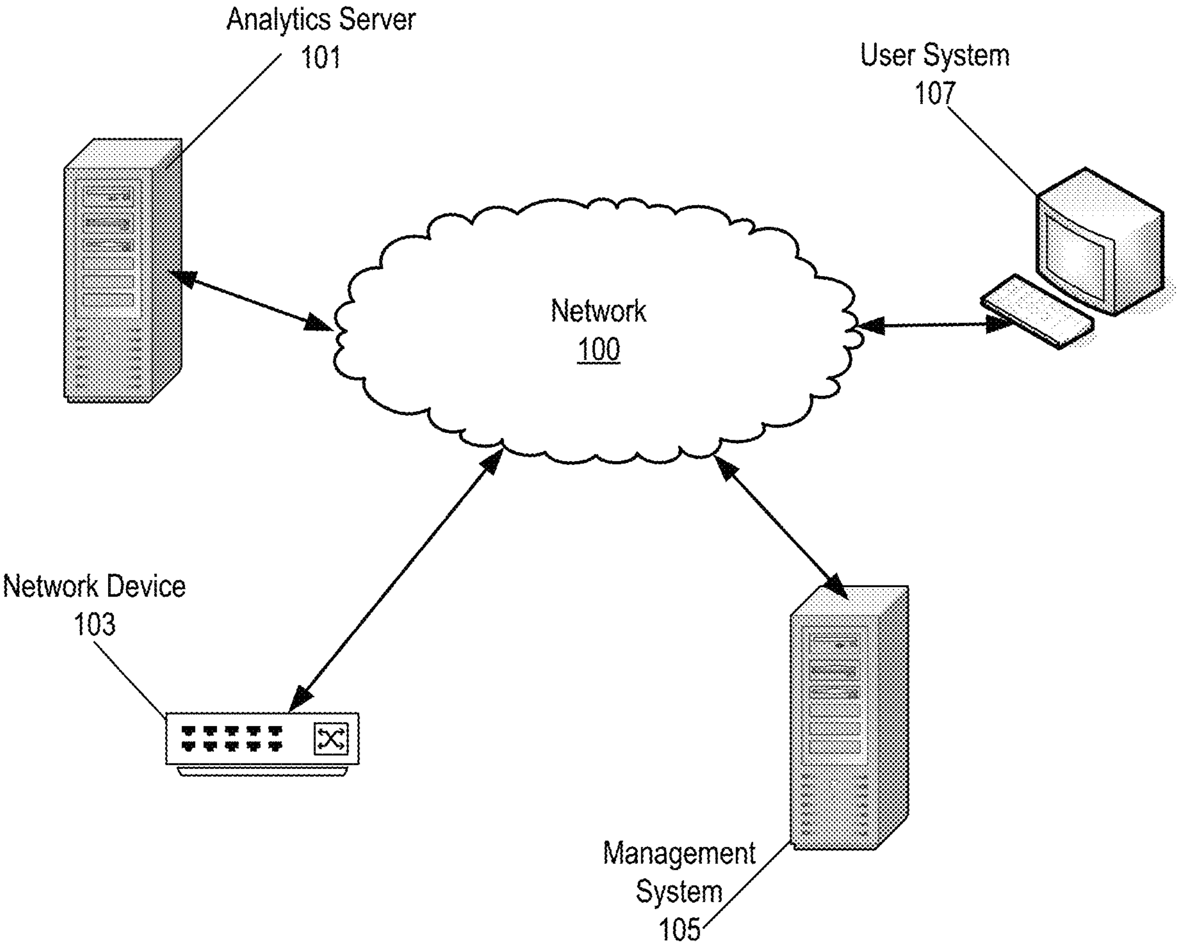
FIG. 1 sets forth a network diagram of a system configured for telemetry-based network switch configuration validation according to embodiments of the present invention.

Exemplary methods, apparatus, and products for telemetry-based network switch configuration validation in accordance with the present invention are described with reference to the accompanying drawings, beginning with FIG. 1. FIG. 1 sets forth a network diagram of a system configured for telemetry-based network switch configuration validation according to embodiments of the present invention. The system of FIG. 1 includes at least one network device (103). The network device (103) mediates communication among devices in the network (100). For example, the network device (103) may be a network switch, a router, a bridge, a gateway, and the like.

The system of FIG. 1 also includes a management server (105) that hosts a network infrastructure application or a network orchestration application that controls pools of networking, processing, and storage resources throughout the network (100), for example, in a data center. The management server (105) enacts network configuration changes received from the user system (107) by, for example, sending configuration commands to network devices such as the network device (103). The user system (107) may be a host system used by any entity (e.g., IT personnel or a network administration application) that generates requests for configuration changes to the network (100). The user system (107) transmits network configuration changes made by the entity to the management server (105), which communicates with the network device (103) to apply the configuration changes.

It is a common issue that network configuration changes result in configuration errors that introduce performance problems in the network (100). The problems associated with the configuration errors typically manifest several minutes or hours after the configuration changes take effect and commonly introduce behaviors such as network congestion (e.g., leading to latency), packet loss, resource exhaustion, routing loops, etc. To address performance problems in a network, one solution is a brute force solution in which the problems are typically not addressed until IT personnel or network support engineers are alerted to the performance problems and troubleshoot the issue. It may be that, after hours of troubleshooting and forensic analysis, the personnel will discover that it was the configuration change that caused the performance problems. In the time it takes to discover the source of the problem, the problem continues to propagate through the network, possibly creating additional problems in other parts of the network. Another solution is the use of mathematical models to simulate to simulate networks and design traffic patterns. These solutions provide computer-based logical simulations of how the traffic will flow in a physical network. However, these simulations may not accurately recreate specific aspects of hardware functionality. In other words, the simulations are limited in scope as they principally focus on reachability and traffic distribution metrics for bandwidth calculations.

Embodiments in accordance with the present invention include the analytics server (101) of FIG. 1 for telemetry-based network switch configuration validation, so that configuration errors may be detected before their potential impact on network performance becomes severe. The analytics server (101) receives telemetry data from the network device (103). Before the management server (105) sends a list of configuration commands to the network device (103), it notifies the analytics server (101) about this upcoming event. The analytics server (101), upon receiving this event, creates a snapshot based on the telemetry data available at that time and the context of the configuration change, saves this snapshot, and sends an acknowledgment back to the management server (105). This snapshot is a pre-configuration change snapshot. After the management server (105) applies the changes to the network device (103) and notifies the analytics server (101) about the configuration changes, the analytics server (101) starts a timer (e.g. 5 minutes), and after the timer expires, the analytics creates another snapshot based on the telemetry data from the network device (103) and saves the snapshot as a configuration validation snapshot. The analytics server (101) then compares the pre-configuration snapshot and the configuration validation snapshot and analyzes the comparison to discover any drastic changes in the performance of the network device (103) that reveal serious problems in the network. If potential problems are detected, the analytics server (101) generates a notification indicating that the last configuration change likely introduced problems in the network. Problematic symptoms detected may include, for example, congestion drops, packet loss, resource exhaustion (e.g. buffers, system memory, CPU usage), broadcast storm, and routing loops. The management server may decide to revert the changes or simply notify user system (107).

The network device (103), analytics server (101), management system (105), and the user system (107) may be logically or physical part of a data center (120).

The arrangement of servers, terminals, network devices (e.g. switches), and other devices making up the exemplary system illustrated in FIG. 1 are for explanation, not for limitation. Data processing systems useful according to various embodiments of the present invention may include additional servers, routers, and other devices not shown in FIG. 1, as will occur to those of skill in the art. Networks in such data processing systems may support many data communications protocols and standards, including for example TCP (Transmission Control Protocol), IP (Internet Protocol), UDP (User Datagram Protocol), Ethernet, and others as will occur to those of skill in the art. Various embodiments of the present invention may be implemented on a variety of hardware platforms in addition to those illustrated in FIG. 1.

Telemetry-based network switch configuration validation in accordance with the present invention is generally implemented with computers, that is, with automated computing machinery. In the system of FIG. 1, for example, all the management server (105), user system (107), network devices (103), and analytics server (101) are implemented to some extent at least as automated computing machinery. For further explanation, therefore, FIG. 2 sets forth a block diagram of automated computing machinery comprising an exemplary computer (152) configured for telemetry-based network switch configuration validation according to embodiments of the present invention. The computer (152) of FIG. 2 includes at least one computer processor (156) or 'CPU' as well as random access memory (168) (RAM') which is connected through a high speed memory bus (166) and bus adapter (158) to processor (156) and to other components of the computer (152).

Stored in RAM (168) is an analytics engine (301), a module of computer program instructions improved for telemetry-based network switch configuration validation according to embodiments of the present invention. The analytics engine (301) includes computer program instructions for capturing, by the analytics engine, a first network snapshot including telemetry data received from one or more network switches in a first state, receiving a notice indicating that network configuration change has been applied, initiating, by the analytics engine, a timer in response to receiving the notice, capturing, by the analytics engine in response to expiration of the timer, a second network snapshot including telemetry data received from the one or more network switches in a second state, comparing, by the analytics engine, the first network snapshot and the second network snapshot, and validating, in dependence upon the comparison of the first network snapshot to the second network snapshot, the network configuration change.

Also stored in RAM (168) is an operating system (154). Operating systems useful in computers configured for telemetry-based network switch configuration validation according to embodiments of the present invention include UNIX™, Linux™, Microsoft XP™, AIX™, IBM's i5/OS™, and others as will occur to those of skill in the art. The operating system (154) and analytics engine (301) in the example of FIG. 2 are shown in RAM (168), but many components of such software typically are stored in non-volatile memory also, such as, for example, on a disk drive (170).

Figure 2:
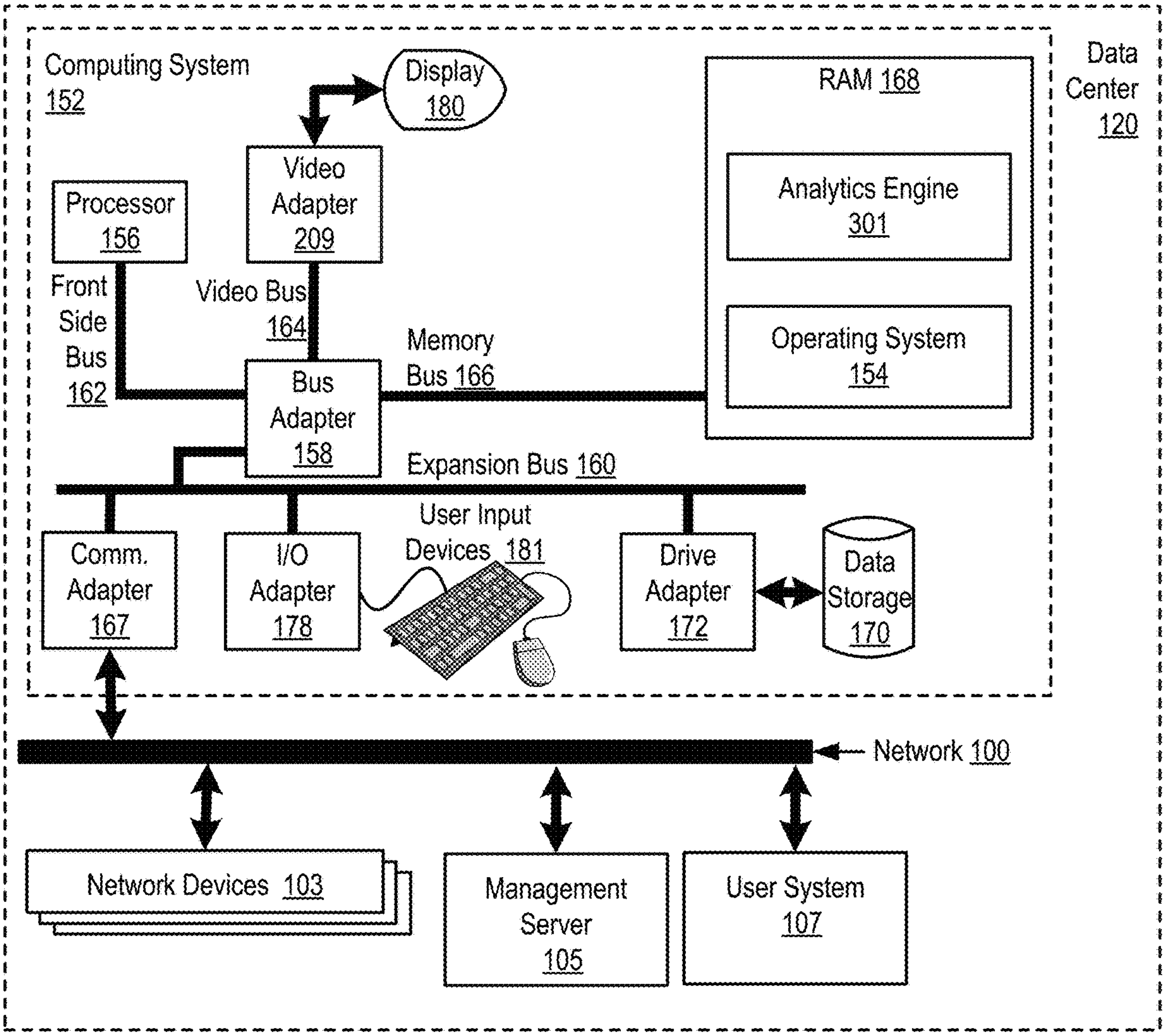
FIG. 2 sets forth a block diagram of an exemplary computing system configured for telemetry-based network switch configuration validation according to embodiments of the present invention.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for telemetry-based network switch configuration validation according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for telemetry-based network switch configuration validation according to embodiments of the present invention include modems for wired dial-up communications, Ethernet (IEEE 802.3) adapters for wired data communications, and 802.11 adapters for wireless data communications. The exemplary computer (152) of FIG. 2 may communicate with other devices, such as the management server (105), one or more network devices (103), and the user system (107), over the network (100).

The network (100) may include a variety of techniques including direct local area network (LAN) connections, wide area network (WAN) connections such as the Internet, a router, storage area network (SAN), Ethernet, and others. The network (100) may comprise one or more LANs, WANs, or SANs. The network (100) further include TCP/IP hardware and/or software, router, repeaters, switches, grids, and/or others. Protocols such as Fibre Channel, Fibre Channel over Ethernet (FCoE), iSCSI, and so forth may be used in network (100). The network devices (103) may be a TCP/IP switch utilizing protocols associated with the network (100).

Figure 3:
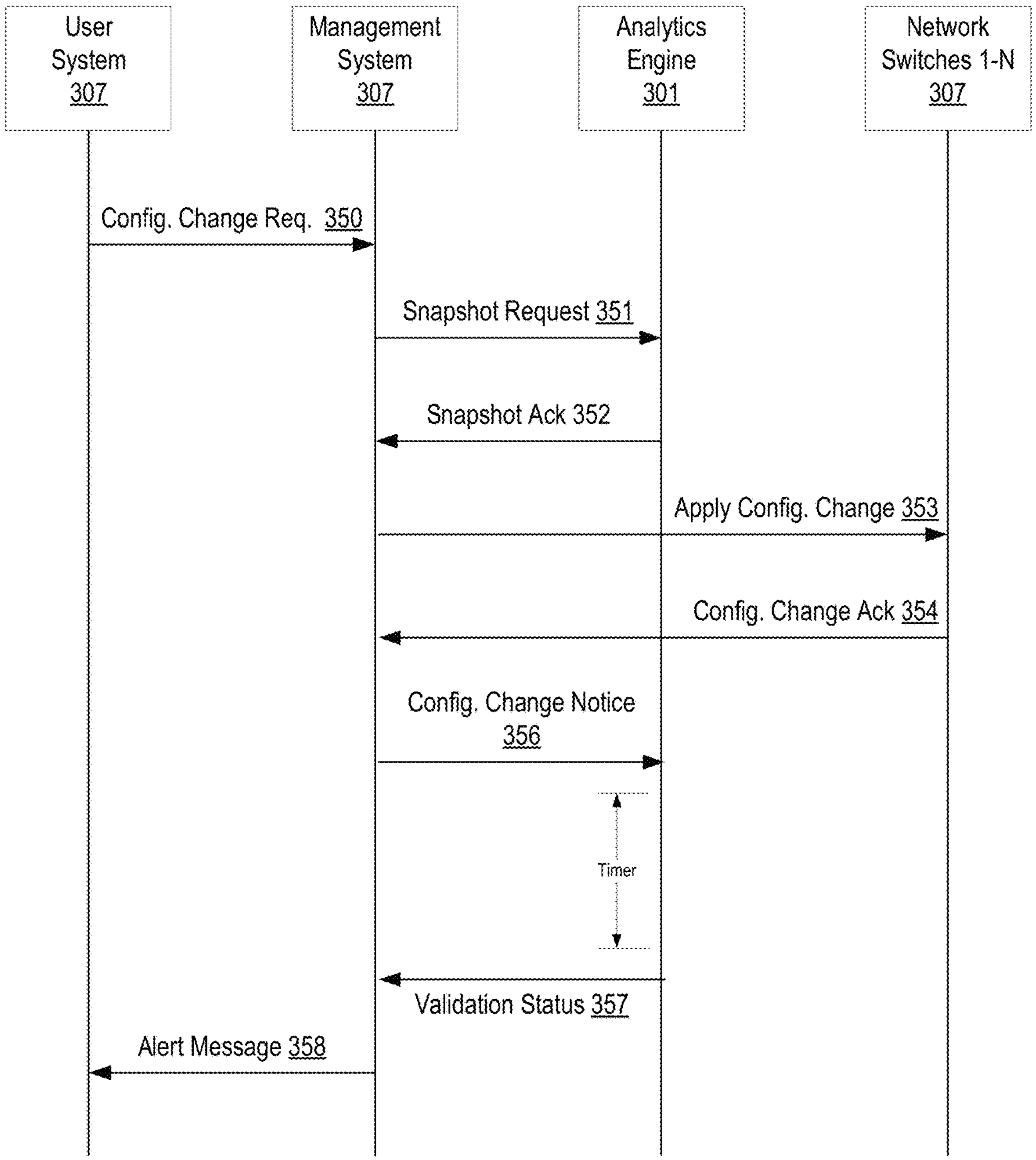
FIG. 3 sets forth an event diagram for an exemplary system for telemetry-based network switch configuration validation according to embodiments of the present invention.

For further explanation, FIG. 3 sets forth an event diagram an exemplary system for telemetry-based network switch configuration validation according to embodiments of the present invention that includes the analytics engine (301), one or more network switches 1-N (303), a management system (305), and a user system (307). The analytics engine (301), which may be configured on the analytics server (101) of FIG. 1, aggregates telemetry data received from one or more network switches (303), which may be configured as the network device (103) of FIG. 1. The telemetry data may be streamed to the analytics engine by subscribing to the data stream from each network switch (303) The telemetry data may be streamed to the analytics engine in real-time, near real-time, or periodically, and/or may be streamed upon an event such as a state change or threshold detection. Each switch (303) may include a number of sensors (not shown) configured to monitor and report device performance metrics and error messages. For example, the sensors on each switch may collect and report data concerning buffer utilization, congestion, forwarding table utilization, system resource utilization, interface statistics, error messages and combinations thereof, as well as other performance metrics and data that will be recognized by those of skill in the art.

Examples of buffer utilization metrics may include statistics for device buffers, ingress port buffers, egress port buffers, unicast queues, multicast queues, CPU queues, request queue element (RQE) queues, port priority groups, and service pools on each switch (303). The analytics engine (301) determines a number of performance factors from the buffer utilization statistics in the received telemetry data. For example, the analytics engine (301) may determine that: an increased utilization of device pools and service pools may indicate that here is too much traffic on the switch and that future packet loss due to congestion is likely; an increased utilization of ingress port buffers, egress port buffers, service pools, or port priority groups may indicate that here is too much traffic coming into a port and that future packet loss due to congestion is likely; an increased utilization of unicast or multicast queues may indicate that there is too much unicast or multicast traffic on a particular port and that future packet loss is due to congestion is likely; an increased utilization of egress CPU buffers may indicate that there is a DoS attack on a particular CPU queue, a drastic network topology change (e.g. new switches or links, failing switches or links), an intermittent network topology change (e.g. link flapping), a drastic management/configuration change, a loop in the network topology, or that there are too many switches in the network that are peers in a network protocol.

Examples of congestion metrics may include rates of port drops, unicast queue class of service (CoS) drops, multicast queue CoS drops on each switch (303). The analytics engine (301) determines a number of performance factors from the congestion statistics in the received telemetry data. For example, the analytics engine (301) may determine that: an increased number of port drops may indicate that there is congestion on the port leading to packet drops; an increased number of unicast queue drops (CoS) may indicate that there is congestion on a port for a particular unicast CoS queue leading to packet drops; an increased number of multicast queue drops (CoS) may indicate that there is congestion on a port for a particular multicast CoS queue leading to packet drops.

Examples of forwarding table utilization metrics may include the utilization of access control list (ACL) tables, address resolution protocol (ARP) tables, IPv4 routing tables, IPv6 routing tables, media access control (MAC) tables, multicast group tables, IPv6 neighbor discovery (ND) tables, table capacity, and current table utilization on each switch (303). The analytics engine (301) determines a number of performance factors from the forwarding table utilization statistics in the received telemetry data, including whether the network is being over utilized, under-utilized, or has an average utilization. For example, the analytics engine (301) may determine that: an increase in the ACL table may indicate are too many ACL rules configured on the switch; an increase in the ARP, MAC, IPv4/IPv6 Routing, and ND tables may indicate that there are too many hosts attached to the network; an increase in the MAC address table may indicate a table overflow attack, a flood of fake source MAC addresses on a given port, or that the number of MAC addresses on a given port is too large; an increase in the ARP table may indicate that there is a broadcast storm from gratuitous ARP packets from a huge number of fake/unknown IP addresses; an increase in the IPv4/IPv6 routing table may indicate that there is a routing table poisoning attack; an increase in the ND table may indicate that there is a IPv6 Neighbor Discovery exhaustion attack.

Examples of system utilization metrics may include statistics for system memory used, system CPU used, per process memory, per process CPU, fan status, power supply status, and temperature sensor status on each switch (303). The analytics engine (301) determines a number of performance factors from the system utilization statistics in the received telemetry data, including whether control plane software on the switch is underutilized, over utilized, or has an average utilization depending on the system memory used. For example, the analytics engine (301) may determine that: an increase in the system memory utilization and/or per process memory utilization may indicate that there is a memory leak; an increase in the system CPU utilization and/or per process CPU utilization may indicate that there is a DoS attack, a drastic network topology change (e.g. new switches or links, failing switches or links), an intermittent network topology change (e.g. link flapping), a drastic management/configuration change, a loop in the network topology, or that there are too many switches in the network that are peers in a network protocol; a fan status metric may indicate that there is a defective fan; a power supply metric may indicate that there is a defective power supply; a temperature sensor metric may indicate that there is a defective temperature sensor.

Examples of system interface statuses may include interface statuses and interface counters on each switch (303). The analytics engine (301) determines a number of performance factors from the interface statistics in the received telemetry data. For example, the analytics engine (301) may determine that: an interface status metric may indicate the percentage of ports are being utilized, whether there may be a physical connectivity problem (e.g. cable, transceiver), and/or whether there may be a link misconfiguration problem; a bytes sent/received interface counter may indicate which ports are underutilized, over utilized, or have an average utilization; a packet discard interface counter may indicate whether packets are being lost; a per traffic type interface counter may indicate the traffic type distribution on a port (i.e., unicast, multicast, broadcast); a per traffic size counter may indicate the traffic size distribution on a port (e.g. 64, 128, . . . , 1548 bytes); an reception interface counter may indicate whether traffic is being corrupted above acceptable levels (e.g., due to duplex mismatch, faulty cabling or defective hardware; a reception errors interface counter may indicate whether traffic is being corrupted due to bad wiring or electrical interference, packet collisions, or that there is congestion on an egress port that could potentially lead to packet drops on the ingress port; a transmission error interface counter may indicate that there is congestion on the other end of a link.

Each switch (303) may also report specific error messages, such as alerts, component failures, or threshold breaches. The analytics engine (301) may extract system error messages generated by the switch (303) from the telemetry data.

Each of the above-described exemplary statistics, metrics, statuses, and messages obtained from the telemetry data provided by each switch (303) represents a state attribute having state attribute value, for example attribute "<cpu_usage>" and value "25%" or attribute "<drop_rate>" and value "5". State information for a switch (303) includes a contemporaneous collection of state attributes and their values. The analytics engine (301) is configured to capture a network snapshot that includes the state information for each switch (303) from telemetry data available at a particular point in time. The snapshot may be saved in a data structure that includes the state information for each switch, for example, as state attribute data and state attribute metadata, as well as other information such as a context identifier and timestamp. The analytics engine (301) is further configured to receive snapshot requests and other notifications from the management system (305).

The management system (305), which may be configured on the management server (105) of FIG. 1, enacts network configuration changes received from the user system (307) by, for example, sending configuration commands to network devices such as the network switches (303). The management system (305) may be, for example, a network infrastructure application or a network orchestration application that controls pools of networking, processing, and storage resources throughout a data center. The user system (307) is any system used by an entity (e.g., IT personnel or a network administration application) that requests configuration changes to the network via the management system (305). In some embodiments, the analytics engine (301) and the management system (305) may be configured on the same server.

In the example of FIG. 3, the user system (307) sends a network configuration change message (350) requesting a network configuration change to the management system (305). Before the management system (305) sends a list of configuration commands to the network switches (303), the management system (305) sends a notification (351) to the analytics engine (301) notifying the analytics engine (301) about this upcoming event and explicitly or implicitly (via a protocol) requesting that the analytics engine (301) capture a pre-configuration change snapshot. The event may carry a context, which includes an identifier, and arguments such as the protocol or feature involved and, potentially, the list of switches affected by the change. In response to the notification (351), the analytics engine (301) captures the pre-configuration change snapshot based on the telemetry data available from network switches (303) and sends an acknowledgement (352) to the management system (305) that indicates the pre-configuration change snapshot has been captured. The management system (305) then sends the configuration change commands (353) to the network switches (303). The network switches (303) provide an acknowledgement (354) to the management system (305) indicating that the configuration changes have been applied, and in response the management system (305) provides a notification (356) to the analytics engine (301) indicating that network configuration changes have been applied.

Continuing the example of FIG. 3, upon receiving the notification (356) that the network configuration changes have been applied, the analytics engine (301) starts a configuration application timer for an amount of time suitable for the network to exhibit effects of the network configuration changes. At the expiration of the timer, the analytics engine (301) captures a configuration validation snapshot that is compared to the pre-configuration change snapshot in order to validate the network configuration changes. As will be explained in further detail below, the analytics engine (301) compares the state information for each switch (303) in the pre-configuration change snapshot (a time prior to the application of configuration changes to the state information for each switch (303) in the configuration validation snapshot (a time after the configuration changes are applied). Based on the comparison of the pre-configuration change snapshot to the configuration validation snapshot, the analytics engine (301) determines whether the network configuration changes have had a substantial negative impact on network performance or otherwise have caused a deterioration in network performance, as manifested by an increase in the utilization of network switch resources or systemic failure. The analytics engine then sends a validation message (357) to the management system (305) indicating the result status of the network configuration change validation. For example, when the network does not demonstrate malfunction, failure, or other problems potentially caused by the network configuration changes, the results status is a validation pass, and when the network does demonstrate malfunction, failure, or other problems potentially caused by the network configuration changes, the results status is a validation fail. The management system (305) may then take action on a failed validation, such as by automatically reverting the network configuration changes or by sending an alert (358) to the user system (307). In the event of a validation fail, the management system (305) may also provide a diagnostic report that identifies specific symptoms of network performance deterioration to the user system (307). Accordingly, problems caused by configuration errors may be detected before the negative effects of the configuration changes worsen and corrective action may be taken.

For further explanation, FIG. 4 sets forth a flow chart illustrating an exemplary method for telemetry-based network switch configuration validation according to embodiments of the present invention that includes capturing (410), by the analytics engine, a first network snapshot including telemetry data received from one or more network switches in a first state. Capturing (410), by the analytics engine, a first network snapshot including telemetry data received from one or more network switches in a first state may be carried out by the analytics engine (301) recording contemporaneous state information for each switch (303) at a point in time before a network configuration change is applied. The state information may be represented as statistics and messages derived from the telemetry data received from each switch (303). The telemetry data may be received from the switches (303) as streaming data reported by the switch (303) as a periodic push or a threshold-triggered report and/or on as ad hoc reports transmitted at the request of the analytics engine (303). For example, the telemetry data for each switch (303) may include buffer utilization metrics, congestion metrics, forwarding table utilization metrics, system statistics, interface statuses, error messages (as described above) and combinations thereof, as well as other network switch statistics that will be recognized by those of skill in the art. Capturing (410), by the analytics engine, a first network snapshot including telemetry data received from one or more network switches in a first state may include identifying, by the analytics engine (301), state information attributes (e.g., packet drop rate, CPU utilization, etc.) from the telemetry data for each switch (303) and recording a value (e.g., 5 per second, 25%, etc.) for each attribute at a particular point in time. The first network snapshot includes a data set of state attributes and their values obtained from each switch at the particular point in time before the application of a configuration change by the management system (305).

The method of FIG. 4 also includes receiving (420) a notice indicating that network configuration change has been applied. Receiving (420) a notice indicating that network configuration change has been applied may be carried out by the analytics engine (301) receiving a notification (356) from the management system (305) indicating that the switches (303) have applied the configuration change, and may further include a request that the analytics engine create a post-configuration change network snapshot. For example, the management system (305) may send the configuration change command message (353) to the switches (303), and each switch (303) may respond with the configuration change acknowledgement message (354) indicating that the network configuration changes have been applied. After the configuration changes have been applied by each switch (303), the management system (305) sends the notification (356) that is received by the analytics engine (301) indicating the application of the network configuration changes by the switches (303).

The method of FIG. 4 also includes initiating (430), by the analytics engine, a timer in response to receiving the notice. Initiating (430), by the analytics engine, a timer in response to receiving the notice may be carried out by the analytics engine (301) starting a timer in response to receiving the notification (356). The value of the timer is a length of time suitable to allow the effects of the network configuration change to propagate through the network (e.g., 5 minutes, 1 hour, etc.). The timer value may be predetermined default value, may be specified by a network administrator, or may be specified by the management system (305), such as in the snapshot request message (351) or the configuration change notification (356).

The method of FIG. 4 also includes capturing (440), by the analytics engine in response to expiration of the timer, a second network snapshot including telemetry data received from the one or more network switches in a second state. Capturing (440), by the analytics engine in response to expiration of the timer, a second network snapshot including telemetry data received from the one or more network switches in a second state may be carried out by the analytics engine (301) recording contemporaneous state information for each switch (303) at the expiration of the timer (i.e., a point in time after the network configuration change has been applied). Generally, capturing (440), by the analytics engine in response to expiration of the timer, a second network snapshot including telemetry data received from the one or more network switches in a second state is carried out in the same manner as capturing (410), by the analytics engine, a first network snapshot including telemetry data received from one or more network switches in a first state, including receiving the telemetry data from each switch (303) that includes the buffer utilization statistics, congestion statistics, forwarding table utilization, system statistics, and error messages, as well as other network switch statistics that will be recognized by those of skill in the art. Capturing (440), by the analytics engine in response to expiration of the timer, a second network snapshot including telemetry data received from the one or more network switches in a second state may include identifying, by the analytics engine (301), state information attributes (e.g., packet drop rate, CPU utilization, etc.) from the telemetry data for each switch (303) and recording a value (e.g., 5 per second, 25%, etc.) for each attribute at a particular point in time. The second network snapshot includes a data set of state attributes and their values obtained from each switch at the particular point in time after the application of a configuration change by the management system (305) and the expiration of the timer.

The method of FIG. 4 also includes comparing (450) the first network snapshot and the second network snapshot. Comparing (450) the first network snapshot and the second network snapshot may be carried out by the analytics engine (301) comparing the data set of telemetry data attributes and their values from the first network snapshot to a corresponding data set of telemetry data attributes and their values from the second network snapshot. For example, the analytics engine (301) may identify substantial changes between the first network snapshot and the second network snapshot indicative of problems or performance deterioration caused by the configuration change. For example, a substantial increase (e.g., 50%) in any or all of buffer utilization, congestion metrics, forwarding table utilization, and system resource utilization may indicate a network performance deterioration potentially caused by the network configuration change. The analytics engine (301) may also determine that an error message captured in the second network snapshot was not present in the first network snapshot. As one example, the boundaries of normal operating behavior may be defined by thresholds. In an embodiment, the thresholds determining a substantial increase in resource utilization may set by a network administrator. In another embodiment, machine learning may be employed to identify historical trends and determine thresholds for normal (i.e., expected) operating behavior. Readers of skill in the art will appreciate that parameters for defining normal operating behavior may be established through other mechanisms.

The method of FIG. 4 also includes validating (460), in dependence upon the comparison of the first network snapshot to the second network snapshot, the network configuration change. Validating (460), in dependence upon the comparison of the first network snapshot to the second network snapshot, the network configuration change may be carried out by the analytics engine (301) generating a notification indicating whether the network configuration change has potentially negatively impacted network performance. When a potential network malfunction is not detected from the comparison, the analytics engine (301) generates a validation passed notification. Whereas, when a potential network malfunction is detected from the comparison, the analytics engine (301) generates a validation failed notification including a diagnostic report. For example, validating (460), in dependence upon the comparison of the first network snapshot to the second network snapshot, the network configuration may include the analytics engine (301) sending a notification to the management system (305) that the network configuration change has not had an impact on network performance as represented by state information changes in the comparison of the first network snapshot and the second network snapshot. Validating (460), in dependence upon the comparison of the first network snapshot to the second network snapshot, the network configuration may also include the analytics engine (301) sending a notification to the management system (305) that the network configuration change has substantially impacted network performance in a negative manner as represented by state information changes in the comparison of the first network snapshot and the second network snapshot. The diagnostic report may include all raw data from the second network snapshot. The diagnostic report may also include switch resource utilization measurements that are outside of defined normal operating parameters. The diagnostic report may also include a recommendation, such as a recommendation that the configuration changes be reversed.

For further explanation, FIG. 5 sets forth a flow chart illustrating a further exemplary method for telemetry-based network switch configuration validation according to embodiments of the present invention. Like FIG. 4, the exemplary method of FIG. 5 also includes capturing (410), by the analytics engine, a first network snapshot including telemetry data received from one or more network switches in a first state, receiving (420) a notice indicating that network configuration change has been applied, initiating (430), by the analytics engine, a timer in response to receiving the notice, capturing (440), by the analytics engine in response to expiration of the timer, a second network snapshot including telemetry data received from the one or more network switches in a second state, comparing (450), by the analytics engine, the first network snapshot and the second network snapshot, and validating (460), in dependence upon the comparison of the first network snapshot to the second network snapshot, the network configuration change.

The method of FIG. 5 differs from the method of FIG. 4 in that capturing (410), by the analytics engine, a first network snapshot including telemetry data received from one or more network switches in a first state includes receiving (510), from a requestor, a request to create a pre-configuration snapshot. Receiving (510), from a requestor, a notification of indicating a configuration change event may be carried out by the analytics engine receiving the configuration changed event notification from the management server (305). For example, the notification may include a request (351) to create a pre-configuration snapshot received by the analytics engine (301) from the management system (305). For example, the configuration change event notification may carry a context that includes an identifier, arguments such as protocols or features involved in the change, and/or a list of switches potentially affected by the configuration change.

The method of FIG. 5 also differs from the method of FIG. 4 in that capturing (410), by the analytics engine, a first network snapshot including telemetry data received from one or more network switches in a first state further includes collecting (520) current state information from the telemetry data received from the one or more switches. Collecting (520) current state information from the telemetry data received from the one or more switches may be carried out by the analytics engine (301) capturing telemetry data received from the switches (303) and identifying state information attributes and their values at a particular point in time. Capturing telemetry data received from the switches may include reading real-time or near real-time streams of telemetry data and capturing a current state of telemetry data for one or more switches (303) received, accessing the most recent telemetry data for one or more switches (303) that has been pushed to the analytics engine (301) as a result of a triggered threshold or received in response to a polling of the network switch (303), and/or making an ad hoc request to one or more switches (303) for telemetry data. Identifying state information attributes and their values at a particular point in time may include identifying state information attributes (previously discussed) in the telemetry data received from each switch (303) of the one or more switches and recording the value for each state attribute in each switch (303).

By way of example and not limitation, the analytics engine (301) may receive telemetry data (e.g., buffer utilization metrics, congestion metrics, forwarding table utilization metrics, system resource utilization metrics) from a switch A and a switch B of the set of switches 1-N (303) as subscription-based push of telemetry data from those switches. In this example, switch A reports [<packet_drop_rate>=5; <cpu_utilization>=25%; <device_buffer_utilization>=40%] and switch B reports [<packet_drop_rate>=3; <cpu_utilization>=50%; <device_buffer_utilization>=30%]. The analytics engine identifies packet drop rate, CPU utilization, and device buffer utilization as reported state information attributes from switch A and switch B and records the values for the identified attributes.

The method of FIG. 5 also differs from the method of FIG. 4 in that capturing (410), by the analytics engine, a first network snapshot including telemetry data received from one or more network switches in a first state further includes generating (530) the first network snapshot from the collected state information. Generating (530) the first network snapshot from the collected state information may be carried out by the analytics engine (301) creating one or more data structures that stores a set of data compiled from the collected current state information from the telemetry data received from each of the one or more switches. For example, the analytics engine (301) may create a data structure to store a data set embodying the identified state attributes and their values obtained from the telemetry data received from each of the one or more switches (303).

The method of FIG. 5 also differs from the method of FIG. 4 in that capturing (410), by the analytics engine, a first network snapshot including telemetry data received from one or more network switches in a first state further includes sending (540), to the requestor, an indication that the pre-configuration snapshot has been created. Sending (540), to the requestor, an indication that the pre-configuration snapshot has been created may be carried out by the analytics engine (301) sending a acknowledgement message (352) to the management system (305) that the pre-configuration change snapshot has been created. The acknowledgement message (352) may refer to a configuration change event context such as an identifier.

For further explanation, FIG. 6 sets forth a flow chart illustrating a further exemplary method for telemetry-based network switch configuration validation according to embodiments of the present invention. Like FIG. 4, the exemplary method of FIG. 6 also includes capturing (410), by the analytics engine, a first network snapshot including telemetry data received from one or more network switches in a first state, receiving (420) a notice indicating that network configuration change has been applied, initiating (430), by the analytics engine, a timer in response to receiving the notice, capturing (440), by the analytics engine in response to expiration of the timer, a second network snapshot including telemetry data received from the one or more network switches in a second state, comparing (450), by the analytics engine, the first network snapshot and the second network snapshot, and validating (460), in dependence upon the comparison of the first network snapshot to the second network snapshot, the network configuration change.

The method of FIG. 6 differs from the method of FIG. 4 in that capturing (440), by the analytics engine in response to expiration of the timer, a second network snapshot including telemetry data received from the one or more network switches in a second state includes collecting (610), after the timer has expired, current state information from the telemetry data received from the one or more switches. Collecting (610), after the timer has expired, current state information from the telemetry data received from the one or more switches may be carried out by the analytics engine (301), upon expiration of the timer, capturing telemetry data received from the switches (303) and identifying state information attributes and their values at a particular point in time. Reading telemetry data received from the switches may include reading real-time or near real-time streams of telemetry data and capturing a current state of telemetry data for one or more switches (303) received, accessing the most recent telemetry data for one or more switches (303) that has been pushed to the analytics engine (301) as a result of a triggered threshold or received in response to a polling of the network switch (303), and/or making an ad hoc request to one or more switches (303) for telemetry data. Identifying state information attributes and their values at a particular point in time may include identifying state information attributes (previously discussed) in the telemetry data received from each switch (303) of the one or more switches and recording the value for each state attribute in each switch (303).

The method of FIG. 6 also differs from the method of FIG. 4 in that capturing (440), by the analytics engine in response to expiration of the timer, a second network snapshot including telemetry data received from the one or more network switches in a second state further includes generating (620) the second network snapshot from the collected state information. Generating (620) the second network snapshot from the collected state information may be carried out by the analytics engine (301) creating one or more second data structures that stores a second set of data compiled from the collected current state information from the telemetry data received from each of the one or more switches. For example, the analytics engine (301) may create a second data structure to store a data set embodying the identified state attributes and their values obtained from the telemetry data received from each of the one or more switches (303) in a state after the network configuration change has been applied.

For further explanation, FIG. 7 sets forth a flow chart illustrating a further exemplary method for telemetry-based network switch configuration validation according to embodiments of the present invention. Like FIG. 4, the exemplary method of FIG. 7 also includes capturing (410), by the analytics engine, a first network snapshot including telemetry data received from one or more network switches in a first state, receiving (420) a notice indicating that network configuration change has been applied, initiating (430), by the analytics engine, a timer in response to receiving the notice, capturing (440), by the analytics engine in response to expiration of the timer, a second network snapshot including telemetry data received from the one or more network switches in a second state, comparing (450), by the analytics engine, the first network snapshot and the second network snapshot, and validating (460), in dependence upon the comparison of the first network snapshot to the second network snapshot, the network configuration change.

The method of FIG. 7 differs from the method of FIG. 4 in that comparing (450), by the analytics engine, the first network snapshot and the second network snapshot includes comparing (710), for each network switch, first state information from first network snapshot to a corresponding second state information from the second network snapshot. Comparing (710), for each network switch, first state information from first network snapshot to a corresponding second state information from the second network snapshot may be carried out by the analytics engine (301) comparing, for each switch (303), state information of that switch (303) embodied in the first network snapshot to corresponding state information of that switch (303) embodied in the second network snapshot. The analytics engine (301) compares, for each switch 1-N of switches (301), the data set of state attributes from the first network snapshot to the same state attributes in the second network snapshot. By way of example and not limitation, for a given switch M, the first network snapshot may include the state information data set: [packet drop rate: 5; CPU usage: 25%; buffer utilization: 50%]. Continuing the example, for the switch M, the second network snapshot may include the state information data set: [<packet_drop_rate>=20; <cpu_usage>=80%; b<uffer_utilization>=99%]. The analytics engine (301) identifies, from the comparison of the first and second network snapshots, that resource consumption in terms of packet congestion, CPU utilization, and buffer utilization have all increased. Based on a comparison of the exemplary data sets for each switch 1-N in the first and second network snapshots, the analytics engine (301) may make a determination as to whether the increase in packet drop rate (per second), CPU utilization, and buffer utilization are indicative of a network performance deterioration potentially caused by the configuration change.

The method of FIG. 7 differs from the method of FIG. 4 in that comparing (450), by the analytics engine, the first network snapshot and the second network snapshot further includes determining (720) whether the state information from the second network snapshot indicates anomalous behavior in the network. Determining (720) whether the state information from the second network snapshot indicates anomalous behavior in the network may be carried out by the analytics engine (301) determining whether an increase in switch resource utilization or error messages, in the second network snapshot as compared to the first network snapshot, for some or all of the network switches is indicative of a problem or performance deterioration in the network that may have been caused by the configuration change. For example, the analytics engine (301) may determine that anomalous behavior is indicated by changes to the values of one or more state attributes for one or more switches (303). The analytics engine may use thresholds, weighted averages, trend analysis, machine learning, and combinations thereof, as well as other techniques that will be appreciated by those of skill in the art for identifying whether anomalous conditions are present in a network switch. By way of example and not limitation, a network configuration change may result in a network topology change that concentrates network traffic on one switch, thus causing a spike in resource utilization and/or packet drops on that switch. A comparison of the second network snapshot to the first network snapshot would reveal that the resource utilization on that switch is abnormally high, and thus the configuration change has potentially created a problem in the network.

Figure 8:
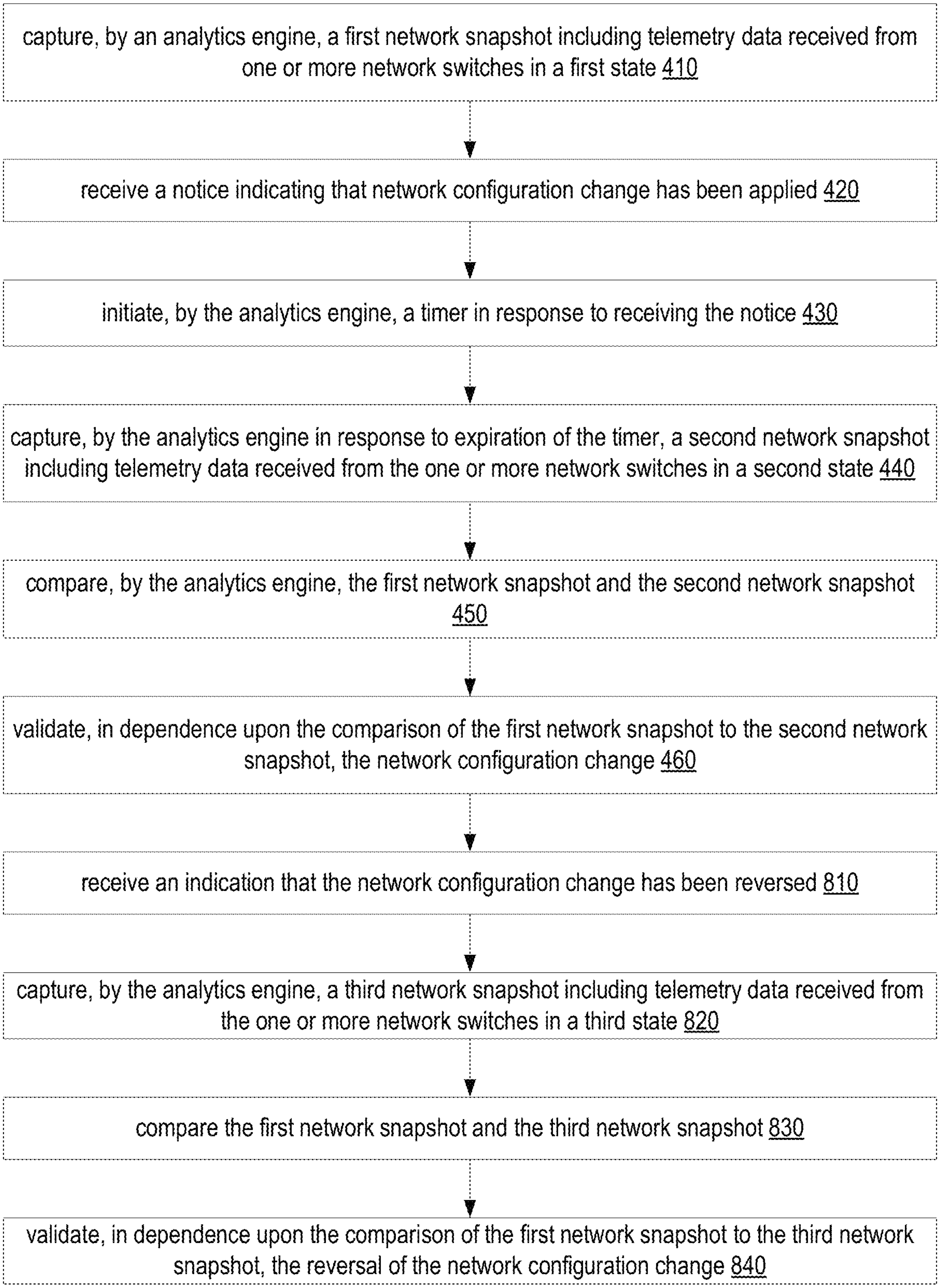
FIG. 8 sets forth a flow chart illustrating another exemplary method for telemetry-based network switch configuration validation according to embodiments of the present invention.

For further explanation, FIG. 8 sets forth a flow chart illustrating a further exemplary method for telemetry-based network switch configuration validation according to embodiments of the present invention. Like FIG. 4, the exemplary method of FIG. 8 also includes capturing (410), by the analytics engine, a first network snapshot including telemetry data received from one or more network switches in a first state, receiving (420) a notice indicating that network configuration change has been applied, initiating (430), by the analytics engine, a timer in response to receiving the notice, capturing (440), by the analytics engine in response to expiration of the timer, a second network snapshot including telemetry data received from the one or more network switches in a second state, comparing (450), by the analytics engine, the first network snapshot and the second network snapshot, and validating (460), in dependence upon the comparison of the first network snapshot to the second network snapshot, the network configuration change.

The method of FIG. 8 differs from the method of FIG. 4 in that the method of FIG. 8 further includes receiving (810) an indication that the network configuration change has been reversed. Receiving (810) an indication that the network configuration change has been reversed may be carried out by the analytics engine (301) receiving a notification from the management system (305) that the configuration changes previously applied have been reversed. The notification may further include a request for another network snapshot The method of FIG. 8 also further includes capturing (820), by the analytics engine, a third network snapshot including telemetry data received from the one or more network switches in a third state. After receiving the indication that the network configuration changes has been reversed, the analytics engine (301) may again start a timer to allow the new configuration change to propagate. Capturing (820), by the analytics engine, a third network snapshot including telemetry data received from the one or more network switches in a third state may be carried out by the analytics engine (301) recording contemporaneous state information for each switch (303) at the expiration of the timer (i.e., a point in time after the network configuration change has been applied). Generally, capturing (820), by the analytics engine, a third network snapshot including telemetry data received from the one or more network switches in a third state is carried out in the same manner as capturing (410), by the analytics engine, a first network snapshot including telemetry data received from one or more network switches in a first state, including receiving the telemetry data from each switch (303) that includes the buffer utilization statistics, congestion statistics, forwarding table utilization, system statistics, and error messages, as well as other network switch statistics that will be recognized by those of skill in the art.

The method of FIG. 8 also further includes comparing (830) the first network snapshot and the third network snapshot. Comparing (830) the first network snapshot and the third network snapshot may be carried out by the analytics engine (301) comparing the data set of telemetry data attributes and their values from the first network snapshot to a corresponding data set of telemetry data attributes and their values from the third network snapshot. Comparing (830) the first network snapshot and the third network snapshot may be performed in the same manner as comparing (450), by the analytics engine, the first network snapshot and the second network snapshot.

The method of FIG. 8 also further includes validating (840), in dependence upon the comparison of the first network snapshot to the third network snapshot, the reversal of the network configuration change. Validating (840), in dependence upon the comparison of the first network snapshot to the third network snapshot, the reversal of the network configuration change may be carried out by the analytics engine (301) determine when the second configuration changes (i.e., the reversal of the configuration change) has restored the network to acceptable operating conditions. For example, when the first network snapshot is used as the benchmark, the analytics engine (301) determines from the third network snapshot whether the reversal of the configuration changes removed the anomalous operating conditions, such as overutilization of switch resources.

In view of the explanations set forth above, readers will recognize that the benefits of telemetry-based network switch configuration validation according to embodiments of the present invention include:

- an analytics engine driven by network telemetry information that can coordinate with a management system to validate configuration changes and ensure that these changes will not lead to serious network problems
- improved network performance due to rapid detection of potential network problems before their impact becomes overwhelming
- wide applicability to any system where telemetry data from the physical infrastructure is available, and not just scenarios that can be simulated via a logical infrastructure.

Exemplary embodiments of the present invention are described largely in the context of a fully functional computer system for telemetry-based network switch configuration validation. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of telemetry-based network switch configuration validation, the method comprising:

capturing, by an analytics engine, a first network snapshot including telemetry data received from one or more network switches in a first state;

receiving a notice indicating that a network configuration change has been applied;

initiating, by the analytics engine, a timer in response to receiving the notice;

capturing, by the analytics engine in response to expiration of the timer, a second network snapshot including telemetry data received from the one or more network switches in a second state;

comparing, by the analytics engine, the first network snapshot and the second network snapshot; and validating, by the analytics engine, in dependence upon the comparison of the first network snapshot to the second network snapshot and in dependence on whether a potential network malfunction is detected, the network configuration change, wherein the validating includes validating that the network configuration change has not had a substantial negative impact on network performance, the substantial negative impact defined by a threshold.

2. The method of claim 1, wherein the telemetry data for each switch includes at least one of buffer utilization metrics, congestion metrics, forwarding table utilization metrics, interface statuses, system statistics, and error messages.

3. The method of claim 1, wherein capturing, by the analytics engine, the first network snapshot including telemetry data received from the one or more network switches in the first state includes:

receiving, from a requestor, a request to create a pre-configuration snapshot;

collecting current state information from the telemetry data received from the one or more switches;

generating the first network snapshot from the collected state information; and sending, to the requestor, an indication that the pre-configuration snapshot has been created.

4. The method of claim 1, wherein capturing, by the analytics engine in response to expiration of the timer, the second network snapshot including telemetry data received from the one or more network switches in the second state includes:

collecting, after the timer has expired, current state information from the telemetry data received from the one or more switches; and generating the second network snapshot from the collected state information.

5. The method of claim 1, wherein comparing the first network snapshot and the second network snapshot includes:

comparing, for each network switch, first state information from first network snapshot to a corresponding second state information from the second network snapshot; and determining whether the state information from the second network snapshot indicates anomalous behavior in the network.

6. The method of claim 1, wherein validating, in dependence upon the comparison of the first network snapshot to the second network snapshot, the network configuration change includes:

when a potential network malfunction is not detected from the comparison, generating a validation passed notification; and when a potential network malfunction is detected from the comparison, generating a validation failed notification including a diagnostic report.

7. The method of claim 1, further comprising:

receiving an indication that the network configuration change has been reversed;

capturing, by the analytics engine, a third network snapshot including telemetry data received from the one or more network switches in a third state;

comparing the first network snapshot and the third network snapshot; and validating, in dependence upon the comparison of the first network snapshot to the third network snapshot, the reversal of the network configuration change.

8. An apparatus for telemetry-based network switch configuration validation, the apparatus comprising a computer processor, a computer memory operatively coupled to the computer processor, the computer memory having disposed within it computer program instructions that, when executed by the computer processor, cause the apparatus to carry out the steps of:

capturing, by an analytics engine, a first network snapshot including telemetry data received from one or more network switches in a first state;

receiving a notice indicating that a network configuration change has been applied;

initiating, by the analytics engine, a timer in response to receiving the notice;

capturing, by the analytics engine in response to expiration of the timer, a second network snapshot including telemetry data received from the one or more network switches in a second state;

comparing, by the analytics engine, the first network snapshot and the second network snapshot; and validating, by the analytics engine, in dependence upon the comparison of the first network snapshot to the second network snapshot and in dependence on whether a potential network malfunction is detected, the network configuration change, wherein the validating includes validating that the network configuration change has not had a substantial negative impact on network performance, the substantial negative impact defined by a threshold.

9. The apparatus of claim 8, wherein the telemetry data for each switch includes at least one of buffer utilization metrics, congestion metrics, forwarding table utilization metrics, interface statuses, system statistics, and error messages.

10. The apparatus of claim 8, wherein capturing, by the analytics engine, the first network snapshot including telemetry data received from the one or more network switches in the first state includes:

receiving, from a requestor, a request to create a pre-configuration snapshot;

collecting current state information from the telemetry data received from the one or more switches;

generating the first network snapshot from the collected state information; and sending, to the requestor, an indication that the pre-configuration snapshot has been created.

11. The apparatus of claim 8, wherein capturing, by the analytics engine in response to expiration of the timer, the second network snapshot including telemetry data received from the one or more network switches in the second state includes:

collecting, after the timer has expired, current state information from the telemetry data received from the one or more switches; and generating the second network snapshot from the collected state information.

12. The apparatus of claim 8, wherein comparing the first network snapshot and the second network snapshot includes:

comparing, for each network switch, first state information from first network snapshot to a corresponding second state information from the second network snapshot; and determining whether the state information from the second network snapshot indicates anomalous behavior in the network.

13. The apparatus of claim 8, wherein validating, in dependence upon the comparison of the first network snapshot to the second network snapshot, the network configuration change includes:

when a potential network malfunction is not detected from the comparison, generating a validation passed notification; and when a potential network malfunction is detected from the comparison, generating a validation failed notification including a diagnostic report.

14. The apparatus of claim 8, further comprising:

receiving an indication that the network configuration change has been reversed;

capturing, by the analytics engine, a third network snapshot including telemetry data received from the one or more network switches in a third state;

comparing the first network snapshot and the third network snapshot; and validating, in dependence upon the comparison of the first network snapshot to the third network snapshot, the reversal of the network configuration change.

15. A computer program product for telemetry-based network switch configuration validation, the computer program product disposed upon a non-volatile computer readable storage medium, the non-volatile computer readable storage medium comprising computer program instructions stored therein that, when executed, cause a computer to carry out the steps of:

capturing, by an analytics engine, a first network snapshot including telemetry data received from one or more network switches in a first state;

receiving a notice indicating that a network configuration change has been applied;

initiating, by the analytics engine, a timer in response to receiving the notice;

capturing, by the analytics engine in response to expiration of the timer, a second network snapshot including telemetry data received from the one or more network switches in a second state;

comparing, by the analytics engine, the first network snapshot and the second network snapshot; and validating, by the analytics engine, in dependence upon the comparison of the first network snapshot to the second network snapshot and in dependence on whether a potential network malfunction is detected, the network configuration change, wherein the validating includes validating that the network configuration change has not had a substantial negative impact on network performance, the substantial negative impact defined by a threshold.

16. The computer program product of claim 15, wherein the telemetry data for each switch includes at least one of buffer utilization metrics, congestion metrics, forwarding table utilization metrics, interface statuses, system statistics, and error messages.

17. The computer program product of claim 15, wherein capturing, by the analytics engine, the first network snapshot including telemetry data received from the one or more network switches in the first state includes:

receiving, from a requestor, a request to create a pre-configuration snapshot;

collecting current state information from the telemetry data received from the one or more switches;

generating the first network snapshot from the collected state information; and sending, to the requestor, an indication that the pre-configuration snapshot has been created.

18. The computer program product of claim 15, wherein capturing, by the analytics engine in response to expiration of the timer, the second network snapshot including telemetry data received from the one or more network switches in the second state includes:

collecting, after the timer has expired, current state information from the telemetry data received from the one or more switches; and generating the second network snapshot from the collected state information.

19. The computer program product of claim 15, wherein comparing the first network snapshot and the second network snapshot includes:

comparing, for each network switch, first state information from first network snapshot to a corresponding second state information from the second network snapshot; and determining whether the state information from the second network snapshot indicates anomalous behavior in the network.

20. The computer program product of claim 15, wherein validating, in dependence upon the comparison of the first network snapshot to the second network snapshot, the network configuration change includes:

when a potential network malfunction is not detected from the comparison, generating a validation passed notification; and when a potential network malfunction is detected from the comparison, generating a validation failed notification including a diagnostic report.

* * * * *